United States Patent Office 3,098,813
Patented July 23, 1963

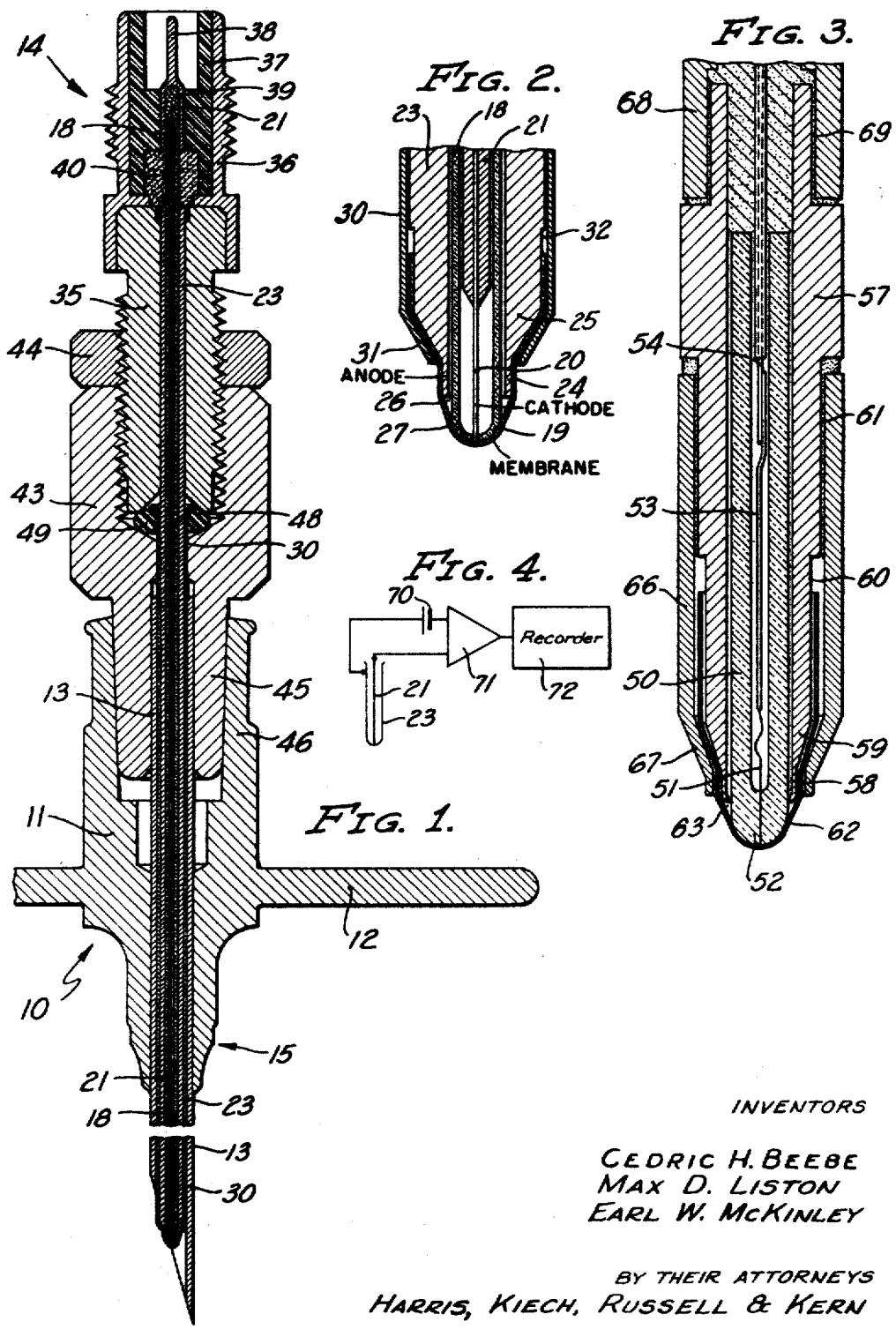

1

3,098,813
ELECTRODE
Cedric H. Beebe, Fullerton, and Max D. Liston, La Habra, Calif., and Earl W. McKinley, Springdale, Conn., assignors to Beckman Instruments, Inc., a corporation of California
Filed Feb. 6, 1959, Ser. No. 791,752
6 Claims. (Cl. 204—195)

This invention relates to electrodes of the polarographic type which provide direct measurements of the proportional quantity of a substance in a composition of matter. The electrode is operated as a polarographic cell and the effect of the substance being measured upon the electrical characteristics of the cell is noted and compared with known or determinable standards to provide a measure of a particular constituent of the composition. In its simplest form, this general type of polarographic cell comprises an anode and a cathode in circuit with each other through a suitable electrolyte or electrolyte-forming substance, one of these electrode elements comprising a sensing element and the other a reference element. The electrolyte is provided by a compound, solution or other suitable material which will form with the anode and cathode an electric cell, and which will provide ions for reactions with the substance which it is desired to measure in such a way as to affect the electrical characteristics of the cell. Alternatively, the substance to be measured may itself be ionizable in the polarographic cell medium and may be directly discharged at one of the electrodes, thereby affecting the electrical characteristics of the cell.

The present invention is particularly related to a polarographic electrode assembly that is physically very small, which may be used inside a hypodermic needle or a catheter or the like, and which by its small size and dimensional parameters will disturb in minimum degree the physical and chemical conditions prevailing at the measuring site. A particularly important application of the present invention is the determination of the oxygen content or tension of blood by direct insertion of the instrument into a vein, artery, heart or other organ.

It is an object of the invention to provide a polarographic electrode assembly which is extremely small, preferably being in the order of one thirty-second of an inch in diameter. A further object is to provide such an instrument which may be inserted into the hollow needle of a conventional hypodermic syringe. Another object of the invention is to provide such an instrument which can be mounted at one end of a flexible tube and can be threaded through a conventional catheter.

It is an object of the invention to provide such an extremely small polarographic electrode assembly having a cathode and an anode positioned at the tip thereof with the electrodes physically separated from each other while bridged electrically by an electrolyte. A further object is to provide such an instrument with a reservoir for electrolyte at the tip end thereof between the electrodes. A further object is to provide such an instrument having a selectively permeable barrier separating the electrodes and electrolyte from the medium being analyzed, the barrier being a membrane permeable to the constituent to be measured and impermeable to other constituents of the composition which might have an effect on the electrical characteristics of the cell. Toward this end, the membrane is positioned over the tip end of the electrode assembly and forms a wall of the electrolyte reservoir.

It is an object of the invention to provide an instrument which depletes in minimum degree at the sensing electrode surface the constituent under test in the sample, thus providing a more accurate measurement and one which is less affected by stirring or sample flow, by temperature variations, by variations in viscosity from one sample to another, and by contamination on the membrane surface. Such low consumption of the constituent under test also affects in minimum degree the environment which is to be observed. Thus, in measurement of oxygen tension in biological tissue, the electrode does not excessively deplete oxygen from the tissue and thereby alter its behavior.

It is an object of the invention to provide a polarographic electrode assembly using a membrane for separating the sample from the electrodes and the electrolyte, wherein the membrane is formed of two or more layers of selectively permeable material, it having been found that a plurality of layers having the same total thickness as a single thickness membrane will materially reduce, relatively, the aforementioned surface depletion effects. A further object is to provide such an instrument wherein the centrally disposed sensing electrode element is substantially cylindrical and the diameter of the exposed surface is relatively very small, this construction serving to reduce considerably the localized exhaustion of sample and the undesirable effects resulting therefrom.

It is an object of the invention to provide a polarographic electrode assembly having concentrically disposed electrodes, the inner electrode being a sensing electrode and being sealed in an insulating tube. Another object is to provide such an instrument having a membrane positioned over both of the electrodes to provide an electrolyte reservoir therebetween. A further object is to provide such a structure having an external sleeve for clamping the membrane in place around the outer electrode. Another object is to provide such an instrument wherein the outer electrode has a conical section and the sleeve has a mating conical tip, the membrane being positioned therebetween and stretched over the convex end of the insulating tube carrying the inner electrode.

It is an object of the invention to provide a polarographic electrode assembly which may be inserted through a hypodermic needle or a catheter and which has a tube of nonconducting material closed at one end, a conductor comprising the sensing electrode element being positioned within said tube and having an end sealed in the closed end of the tube and projecting therethrough to the outer surface thereof. In this arrangement, further, it is desirable to provide an annular ring of conducting material comprising a second or reference electrode disposed around the tube and spaced from the closed end to define an annular space between the outer surface of the tube and the end of the ring, a membrane selectively permeable to a constituent of interest being formed over the closed end of the tube and the outer electrode to enclose an annular space, with an electrolyte being contained within this space, and means being provided for clamping the membrane in position.

The invention also comprises novel details of construction and novel combinations and arrangements of parts, which will more fully appear in the course of the following description. The drawing merely shows and the description merely describes perferred embodiments of the present invention which are given by way of illustration or example.

In the drawing:

FIG. 1 is a sectional view of a preferred embodiment of the invention positioned within a hypodermic needle;

FIG. 2 is an enlarged sectional view of the tip of the embodiment of FIG. 1;

FIG. 3 is a sectional view of an alternative form of the structure of FIG. 2 suitable for use in a catheter; and FIG. 4 is a schematic diagram showing the electrical connections for one mode of operation of the instrument.

FIG. 1 shows one form of the electrode assembly of the invention installed in a conventional Riley needle 10. The Riley needle includes a body 11 having a flange 12 and a pointed hollow tube 13. The electrode assembly is positioned within the tube 13 with the sensitive end exposed at the tip of the needle and has a coupling 14 for a coaxial line carried at the other end. The needle illustrated in FIG. 1 is an 18 gauge thin wall needle, the tube 13 having an outside diameter of 0.049" and an inside diameter of 0.039" and the electrode assembly itself being 0.038" in diameter. The over-all length of the unit is approximately five inches, the length from the end of the coupling 14 to the location indicated by the arrow 15 being two inches and the tube 13 projecting three inches from the body 11.

The lower end of the electrode assembly of FIG. 1 is shown in greater detail in FIG. 2. A tube 18 of glass or other nonconducting material is formed with a closed end 19. The end 19 is ordinarily convex in form and is preferably spherical so that the membrane, to be described, will fit smoothly therearound. A conductor 20, which serves as the sensing electrode element, is sealed in the closed end 19 and projects therethrough to the exterior of the tube. This conductor 20 is necessarily quite small and is preferably a platinum wire 0.0005 inch in diameter. Other suitable materials are, for example, gold, palladium or silver. The platinum conductor 20 is encased in a silver jacket 21 for mechanical strength, the silver being etched away at one end to expose the minute platinum conductor. Such encased, fine noble metal wires are commercially available and are known as Wollaston wire. The wire 20 may be sealed in the end 19 of the tube 18 by using, on a small scale, the familiar techniques of glass working.

After the conductor is sealed in place, it is desirable to etch the outer surface of the end 19 and thereby to cover this surface with a large number of minute pits. The purpose of this step will be described below. Also, it is desirable to polish the tip of the structure with an oil stone or the like to make the wire flush with the end 19 and to provide a smooth junction between the wire and the glass.

A tube 23, which serves as the reference electrode element and is of an electrical conducting material such as silver, is positioned around the tube 18 and is ordinarily cemented thereto to bond the elements together and fill the gap therebetween. The electrode 23 is preferably formed with an annular ring 24 at the end thereof and an adjacent conical section 25. The ring portion 24 is spaced from the tip of the end 19 to define an annular space 26 bounded by the end of the tube 23, the outer periphery of the tube 18 and a membrane 27 which is positioned over the end 19 and the ring portion 24.

An electrolyte is placed in this annular space 26 and the membrane serves as a barrier to separate the electrodes and electrolyte from the composition in which the instrument is placed for analysis purposes. The material of which the membrane is formed may vary in accordance with the properties of the gas, solution or other composition which it is desired to analyze. For example, when the electrode assembly is to be used for determining the oxygen content of blood, the membrane may be of polyethylene, this material being oxygen-permeable and transmitting the oxygen to the interior of the instrument while forming a barrier to other substances which would affect the electrical characteristics of the cell. Other materials suitable for use as membranes are silastic, rubber, polyvinyl chloride, tetrafluorethylene, and polypropylene.

The etched or pitted surface of the end 19 supports a thin film of the electrolyte forming a bridge between the reservoir space and the end of the sensing electrode wire. A perfectly smooth end 19 is undesirable since the membrane would tend to seal against the end and prevent access of electrolyte to the surface of the sensing electrode element.

In other operation of the cell, the electrolyte provides for the flow of electrons in the electro-reduction and electro-oxidation processes used in polarography. For example, in the determination of oxygen content the central, sensing electrode element 20 is a cathode and the annular element 24 is an anode, and there is reduction of oxygen to hydrogen peroxide, according to the reaction

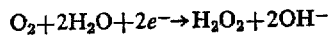

In acid media, the reaction may be written as:

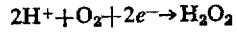

Thus, the electrical characteristics of the cell will be affected in proportion to the quantity of the oxygen which passes through the membrane. The current traversing the cell will vary in direct proportion to the quantity of oxygen passing into the electrolyte, the cell being polarized at the given applied voltage (0.7 v.) in the absence of oxygen and being depolarized when oxygen is present to react with the hydrogen ions. The particular electrolyte used in a specific instrument will depend upon the electrode materials and the constituent being analyzed for. In the preferred embodiment of the invention used for oxygen measurement, sodium and potassium chloride solutions have been found quite suitable as electrolytes with a silver reference electrode. Alternatively, any of a variety of suitable buffer solutions could be used. Other combinations of reference electrode and electrolyte which could be used are, for example, bismuth or bismuth coated with bismuth fluoride and a soluble fluoride electrolyte, lead or lead coated with lead sulphate and a soluble sulphate electrolyte, or amalgamated platinum and an aqueous solution or a slurry of mercurous chloride or aqueous mercurous chloride plus potassium chloride.

A sleeve 30 may be slidingly positioned over the tube 23 for the purpose of holding the membrane 27 in position. A frustoconical end 31 is preferably formed on the sleeve corresponding to the conical section 25 of the tube 23. The membrane is clamped between the section 25 and the end 31, which structure maintains the membrane in position in engagement with the end 19 of the tube 18 and the annular ring 24 of the tube 23. A cylindrical recess 32 on the tube 23 provides clearance for the upper edge of the membrane.

The electrode assembly is mounted in the coupling 14 so that it may be connected into an electrical circuit. The metal tube 23 having the glass tube 18 cemented therein is, in turn, cemented in an inner shell 35 the tube 23 terminating at the upper end of the shell 35. A flanged, externally threaded housing 36 is fitted on the upper end of the shell 35, the class tube 18 and the conductor 21 projecting into the housing. A sleeve 37 of insulating material such as Teflon or the like is fitted in the housing 36 around the tube 18 with a conducting pin 38 positioned over the end of the tube. The interior of the lower end of the pin 38 is filled with a conventional silver paint 39 to provide an electrical connection between the pin and the conductor 21. The space within the sleeve 37 around the tube 18 is filled with a cement 40 to hold the elements in position.

The inner shell 35 is threadedly engaged with an outer shell 43 and has a lock nut 44 for locking the two shells together. The outer shell 43 has a tapered end section 45 which mates with a corresponding tapered section 46 of the needle body 11, the tube 13 of the needle projecting into the outer shell 43.

After the tubes of the electrode have been cemented into the coupling as described above, a small quantity of electrolyte is placed in the electrolyte space 26 and the membrane is positioned over the end of the electrodes. Then the sleeve 30 is slid onto the tube 23 and this assembly is inserted into the outer shell 43. An outwardly flared rim 48 of the sleeve engages an O-ring seal 49 positioned within the shell 43 as the inner shell is threaded into the outer shell, thus applying a clamping force on the membrane at the tip of the electrode assembly. This assembled structure may be inserted into and removed from the Riley needle as desired.

A typical circuit for operation of the electrode assembly of FIG. 1 is shown in FIG. 4. The polarities of connection shown are those that would apply to measurement of oxygen. The anode 23 is connected to the positive side of a battery 70 or other suitable source of voltage through the shell 35 and housing 36, and the cathode 21 is returned to the negative side of the battery by way of the input of an amplifier 71 through the pin 38. The amplifier detects changes in current in the circuit and provides an output to a recorder 72, which output is a function of the current change and, hence, an indication of the quantity of the constituent present in the mixture being analyzed.

An alternative mode of operation is to energize the electrode from the battery in pulse-wise manner, a circuit for which is not shown herein but which will be apparent to those skilled in the art. This has the advantage that consumption of the constituent may be still further reduced and performance correspondingly improved. An incidental advantage is that simple, low-cost, drift free A.C. amplification may be used.

The electrode assembly of the invention provides a very small instrument especially suited to medical and biological studies in which the detecting element must be inserted in a blood vessel or must measure a desired constituent in a very small area or volume of tissue or the like. The structure provides a storage space for electrolyte which permits the instrument to be operated for about two weeks without requiring change of electrolyte. Furthermore, since the electrolyte space is not exposed to the atmosphere and is substantially sealed, the instrument calibration is independent of changes in atmospheric pressure. As indicated previously, the inside diameter of the tube 13 of the Riley needle in the preferred embodiment of the invention is 0.039 inch. The wire 20 in the electrode assembly for use with this needle is 0.0005 inch in diameter and is contained within a glass tube having an outside diameter of 0.013 inch. The anode tube 23 which is cemented to the glass tube has an inside diameter of 0.014 inch and an outside diameter of 0.030 inch. The sleeve 30 is of stainless steel and is a sliding fit over the tube 23 with an outside diameter of 0.038 inch. This dimensional information illustrates the minuteness of the electrode structure of the invention, the complete instrument being only a few thousandths over 1/32 of an inch in diameter.

In making the most accurate measurements by the polarographic cell of the invention, it has been found that effects due to stirring of the sample, variations of sample temperature, sample viscosity variation, effects due to variation in the solubility of the constituent of interest in the sample medium, and membrane surface contamination, all are minimized if the sample medium at the electrode surface is maintained as homogeneous as possible. This means that the amount of the particular constituent which permeates the membrane and is consumed in the cell should be maintained as low as possible, i.e., the operation of the cell should not exhaust unduly the constituent of interest from the sample in the zone immediately contacting the electrode membrane. Expressed differently, the concentration gradient of the sample constituent should ideally exist almost entirely within the membrane, the concentration drop next to the outer membrane surface, as well as in the internal electrolyte, being a minimum. Some features of the present electrode assembly provide this type of operation. It has been found that a substantially smaller amount of constituent is withdrawn from the mixture and homogeneity is better maintained when the diameter of the sensing electrode surface adjoining the membrane is very small, preferably less than the total thickness of the membrane. Thus, in the particular instrument shown in FIGS. 1 and 2, the membrane thickness may be 0.002 inch and the wire diameter may be 0.0005 inch.

In prior polarographic electrodes using membrane-covered sensing elements, the sensing electrode area adjoining the membrane has been relatively large, typically at least several square millimeters in area. Also, it has been substantially coextensive with the solution contact area on the other side of the membrane from which the constituent of interest has diffused through the membrane to the indicating electrode. This has resulted in a relatively marked depletion layer adjoining the outside membrane surface, hence relatively marked stirring effects and effects due to temperature, viscosity variation and the like. We have found that by making the sensing electrode cross section very small, preferably smaller than the membrane thickness, these effects are markedly reduced. Accordingly, the sensing electrode of the invention is in practice usually less than one thousandth inch in diameter. In this arrangement the solution contact area supplying the substance which diffuses toward the electrode is substantially larger than the sensitive electrode area, since the lines of diffusive flow (converging on the sensitive metal surface) converge through the membrane and the sample medium from a wide angle approaching 180°. Accordingly, for the given active area of metal electrode involved, a larger contact area of sample solution is drawn upon and depletion effects are reduced.

The table below shows the performance of electrodes having different ratios of sensitive electrode diameter to membrane thickness. Differences between readings obtained in air and in the various media reflect the extent of formation of a depletion layer, within which the rate of diffusion and, hence, the electrode response is sensitively affected by temperature, viscosity, solubility of the oxygen in the medium, and other factors. Ideally, the same reading would be obtained in each of the liquid media (when saturated by bubbling with air) as is obtained in air itself. This is true because the electrode essentially responds not to the absolute concentration of the dissolved gas, but rather the dissolved gas tension. In the liquids shown, the saturated KCl exemplifies a medium in which the solubility of oxygen is appreciably less than that in pure water. The glycerine-water mixture exemplifies a high viscosity medium. The comparative results shown in the first line of the table attest to the advantage of having the electrode element diameter smaller than the membrane thickness.

*Relative Meter Readings*
[Temp. approx. 24.5° C.]

| Sensing Element Diameter | Air | H$_2$O | Sat'd KCl | 50-50 Glycerine and H$_2$O |
|---|---|---|---|---|
| .0002″ [1] | 89 | 87 (2.2) | 85 (4.7) | 79 (11.2) |
| .0005″ [1] | 87 | 84 (3.5) | 80 (8.4) | 74 (14.9) |
| .002″ [1] | 84.6 | 75.2 (11.1) | 63.0 (25.6) | 48.5 (42.7) |
| .025″ [2] | 58 | 47 (19.0) | 27.5 (52.7) | 26.5 (54.3) |

[1] Two-layer polyethylene membrane, total thickness .0004″.
[2] Two-layer polyethylene membrane, total thickness .002″.
[3] Percent reduction in reading relative to air reading given in parenthesis.

A further advantage of the low rate of consumption of the sample constituent, causing virtually all of the concentration gradient of the constituent to lie within the membrane thickness, is that small amounts of contaminants, e.g., protein deposits on the outer membrane surface, have little effect on the electrode response.

It has also been found that a membrane comprising two or more layers of a given total thickness produces more satisfactory results than a single layer membrane of the same thickness, in that it gives a marked reduction in the rate of consumption of the sample constituent. While the exact cause for this is not fully understood, it appears that the layer construction reduces the channel type of flow which occurs through minute pores and the like in the single membrane, since the probability of coincidence of such pores in the layered construction becomes very small. In the particular instrument of FIGS. 1 and 2, the membrane comprises two layers of polyethylene, each being 0.0002 inch thick.

The results of tests indicating the advantages of the multiple layer construction are shown in the table below. The diameter of the sensitive platinum was .025". The reference electrode was silver-silver chloride, the electrolyte 2% potassium chloride. The loss of response in media other than air shows the extent of formation of an exhaustion layer and the extent to which the electrode will be affected by temperature, stirring effects, viscosity differences, etc. The superiority of the multiple layer construction, showing far more uniform response in the several media than the single membrane arrangement, is apparent.

*Relative Meter Readings*

[All liquid samples saturated with dissolved air by bubbling]

|  | Air | H$_2$O | Sat'd KCl | 50-50 glycerine and H$_2$O |
|---|---|---|---|---|
| 2 layers .001" polyethylene | 74.5 | 71 [1] (4.7) | 67.5 (9.4) | 66 (11.4) |
| 1 layer .02" polyethylene | 97 | 85 (12.4) | 56 (42.3) | 50 (48.5) |

[1] Percent reduction in reading relative to air reading.

An alternative form of construction for the electrode assembly of the invention is shown in FIG. 3. This structure is particularly suited for insertion through a catheter and has been used for determination of oxygen content of blood in a human heart. FIGS. 2 and 3 are drawn to the same scale and the construction of the sensitive end of the instruments are substantially the same. A glass tube 50 has a very fine platinum wire 51 sealed in a closed end 52 in the same manner as the prior embodiment. The wire 51 and the reinforcing silver jacket 53 are formed of a Wollaston wire. This wire is cemented to a Teflon covered copper wire 54 by a suitable silver paint, the copper wire being relatively flexible. A silver tube 57 is positioned around the glass tube 50, the tube 57 having an annular ring-like end 58, a conical section 59 adjacent the end, a first cylindrical recess 60, and a second cylindrical recess 61 of greater diameter. A membrane 62 is positioned over the tubes 50 and 57 as in the earlier embodiment, the membrane and the tubes defining an annular electrolyte space 63.

A sleeve 66, which may be of stainless steel, is slid over the tube 57, the sleeve having an end section 57 of a shape corresponding to the end of the tube 57 for clamping the membrane therebetween. The other end of the sleeve fits into the cylindrical recess 61 to provide a substantial smooth outer surface for the instrument. After the electrolyte has been placed in the electrolyte space, the sleeve is slid into position and cemented in place on the tube 57. A dissolvable cement is used at this point so that the sleeve can be removed for renewal of the electrolyte as needed.

Another cylindrical recess 69 is provided at the upper end of the tube 57 for sliding into a flexible silver tube 68. The tube 57 and the wire 54 are cemented into the tube 68 to complete the assembly of the instrument. The entire structure shown in FIG. 3 is approximately 1/32 inch in diameter and 1/2 inch in length. This structure is relatively rigid but is short enough to be pushed through a catheter by means of the flexible tube 68 which may be several feet in length.

An example of one analysis performed by an electrode of the invention is as follows: The anode or reference electrode was silver coated with silver chloride and the cathode or indicating electrode was platinum, 0.0005 inch diameter. The membrane consisted of two layers of polyethylene, each 0.0002 inch thick and the electrolyte was an aqueous solution of potassium chloride, 1% concentration. The electrical supply was 0.7 volts D.C. connected as in FIG. 4 with the platinum electrode negative with respect to the silver electrode. Various samples comprising pure water saturated (by bubbling) with blended mixtures of nitrogen and oxygen were tested. At 25° C., the 80–20 N$_2$–O$_2$ sample produced $5 \times 10^{-10}$ amperes electrode current and proportional responses were obtained for the other samples.

Examples of constituents other than oxygen which could be measured by the electrode are bromine and chlorine (examples of oxidative components) and sulphur dioxide (a reductive component). For measuring reductive components, the indicating electrode is made positive with respect to the reference electrode.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a polarographic electrode assembly adapted to be inserted through a hypodermic needle for determining the proportional quantity of a constituent of a composition, the combination of: an elongated support body of nonconducting material; a sensing electrode element in the form of a conductor enclosed within said body with an end of said conductor projecting through an end of said body to the outer surface thereof; a reference electrode element in the form of an annular ring of conducting material disposed around said body and spaced from said end defining an annular space between the periphery of said body and said ring for retaining an electrolyte; a membrane having a thickness greater than the maximum width of the end of said conductor projecting through said end of said body, selectively permeable to said constituent and formed over said end and said ring enclosing said annular space; means for electrically connecting each of said electrode elements to an external measuring circuit; and means for clamping said membrane in position.

2. In a polarographic electrode assembly adapted to be inserted through a hypodermic needle for determining the proportional quantity of a constituent of a composition, the combination of: a tube of nonconducting material closed at one end; a sensing electrode element in the form of a substantially cylindrical conductor positioned within said tube with an end of said conductor sealed in said closed end and projecting therethrough to the outer surface thereof; a reference electrode element in the form of an annular ring of conducting material disposed around said tube and spaced from said closed end defining an annular space between the periphery of said tube and the end of said ring for retaining an electrolyte; membrane means selectively permeable to said constituent and formed over said closed end and said ring enclosing said annular space, with the diameter of said conductor being less than the thickness of said membrane means; means for electrically connecting each of said electrode elements to an external measuring circuit; and means for clamping said membrane means in position.

3. In a polarographic electrode assembly adapted to be inserted through a hypodermic needle for determining the proportional quantity of a constituent of a composition, the combination of: a first tube of nonconducting material closed at one end; a sensing electrode element in the form of a conductor positioned within said first tube with an end of said conductor sealed in said closed end and projecting therethrough to the outer surface thereof; a reference electrode element in the form of a second tube of conducting material disposed around said first tube, said second tube having a cylindrical end section and a contiguous conical section, with said end section spaced from said closed end of said first tube defining an annular space between the periphery of said first tube and the end of said second tube for retaining an electrolyte; a membrane having a thickness greater than twice the maximum width of said end of said conductor, selectively permeable to said constituent and formed over said closed end of said first tube and said end and conical sections of said second tube enclosing said annular space; means for electrically connecting each of said electrode elements to an external measuring circuit; and means for clamping said membrane in position.

4. In a polarographic electrode assembly adapted to be inserted through a hypodermic needle for determining the proportional quantity of a constituent of a composition, the combination of: a first tube of nonconducting material closed at one end; a sensing electrode element in the form of a conductor positioned within said first tube with an end of said conductor sealed in said closed end and projecting therethrough to the outer surface thereof; a reference electrode element in the form of a second tube of conducting material disposed around said first tube, said second tube having a cylindrical end section and a contiguous conical section, with said end section spaced from said closed end of said first tube defining an annular space between the periphery of said first tube and the end of said second tube for retaining an electrolyte; a membrane having a thickness greater than twice the maximum width of said end of said conductor, selectively permeable to said constituent and formed over said closed end of said first tube and said end and conical sections of said second tube enclosing said annular space; means for electrically connecting each of said electrode elements to an external measuring circuit; a sleeve having a frustoconical end corresponding to said conical section of said second tube, said sleeve being slidingly positioned over said second tube clamping said membrane between said conical section and said conical end; and means for maintaining said sleeve in position on said second tube.

5. In a polarographic electrode assembly adapted to be inserted through a hypodermic needle for determining the proportional quantity of a constituent of a composition, the combination of: a first tube of nonconducting material closed at one end; a sensing electrode element in the form of a conductor positioned within said tube with an end of said conductor sealed in said closed end and projecting therethrough to the outer surface thereof; a reference electrode element in the form of a second tube of conducting material disposed around said first tube and spaced from said closed end defining an annular space between the periphery of said first tube and the end of said second tube for retaining an electrolyte; a membrane having a thickness greater than the maximum width of said end of said conductor, selectively permeable to said constituent and formed over said closed end and said second tube enclosing said annular space; means for electrically connecting each of said electrode elements to an external measuring circuit; a sleeve slidingly positioned over said second tube and said sleeve, the end of said sleeve remote from said membrane having an outwardly flared rim, with a portion with said membrane disposed between said second tube of said second tube projecting beyond said rim; a first shell fixed to said portion of said second tube; and a second shell slidingly receiving said sleeve and including means engaging said rim for restraining movement of said sleeve in a first direction, said shells including mating portions for advancing said second tube through said sleeve in said first direction to fix said sleeve and tube relative to each other and clamp said membrane in position.

6. In a polarographic electrode assembly adapted to be inserted through a catheter for determining the proportional quantity of a constituent of a composition, the combination of: a first tube of nonconducting material closed at one end; a sensing electrode element in the form of a conductor positioned within said tube with an end of said conductor sealed in said closed end and projecting therethrough to the outer surface thereof; a reference electrode element in the form of a second tube of conducting material disposed around said first tube and spaced from said closed end defining an annular space between the periphery of said first tube and one end of said second tube for retaining an electrolyte, said second tube having a first cylindrical recess adjacent said one end and a second cylindrical recess of greater diameter adjacent said first recess; a membrane having a thickness greater than the maximum width of a said end of said conductor, selectively permeable to said constituent and formed over said closed end of said first tube and said first recess of said second tube enclosing said annular space; means for electrically connecting each of said electrode elements to an external measuring circuit; a sleeve slidingly positioned over said second tube for clamping said membrane at said one end of said second tube, with said sleeve lying in said second recess providing a substantially cylindrical assembly of said sleeve and second tube; and means for maintaining said sleeve in position in said recess.

References Cited in the file of this patent

UNITED STATES PATENTS

| | | |
|---|---|---|
| 2,215,213 | Ellis | Sept. 17, 1940 |
| 2,416,949 | Perley et al. | Mar. 4, 1947 |
| 2,437,697 | Kalom | Mar. 16, 1948 |
| 2,651,612 | Haller | Sept. 8, 1953 |
| 2,805,191 | Hersch | Sept. 3, 1957 |
| 2,913,386 | Clark | Nov. 17, 1959 |
| 3,000,805 | Carritt et al. | Sept. 19, 1961 |

FOREIGN PATENTS

| | | |
|---|---|---|
| 397,303 | Great Britain | Aug. 24, 1933 |
| 628,840 | Great Britain | Sept. 6, 1949 |

OTHER REFERENCES

Montgomery et al.: "J. Clinical Investigation," volume 29, page 1120 (1950).

Clark et al.: "J. of Applied Physiology," volume 6, page 189 (1953).

UNITED STATES PATENT OFFICE
CERTIFICATE OF CORRECTION

Patent No. 3,098,813                                            July 23, 1963

Cedric H. Beebe et al.

It is hereby certified that error appears in the above numbered patent requiring correction and that the said Letters Patent should read as corrected below.

Column 2, line 8, for "purovide" read -- provide --; line 58, for "perferred" read -- preferred --; column 4, line 47, after "shell 35" insert a comma; line 50, for "class" read -- glass --; column 7, in the table, first column, second line thereof, for ".02'" read --.002" --; lines 57 and 58 for "substantial" read -- substantially --; column 10, line 3, strike out "with said membrane disposed between said second tube", and insert the same after "tube" in line 59, column 9.

Signed and sealed this 21st day of January 1964.

(SEAL)
Attest:
ERNEST W. SWIDER

EDWIN L. REYNOLDS

Attesting Officer                              Acting Commissioner of Patents

UNITED STATES PATENT OFFICE
CERTIFICATE OF CORRECTION

Patent No. 3,098,813                                            July 23, 1963

Cedric H. Beebe et al.

It is hereby certified that error appears in the above numbered patent requiring correction and that the said Letters Patent should read as corrected below.

Column 2, line 8, for "purovide" read -- provide --; line 58, for "perferred" read -- preferred --; column 4, line 47, after "shell 35" insert a comma; line 50, for "class" read -- glass --; column 7, in the table, first column, second line thereof, for ".02'" read --.002" --; lines 57 and 58 for "substantial" read -- substantially --; column 10, line 3, strike out "with said membrane disposed between said second tube", and insert the same after "tube" in line 59, column 9.

Signed and sealed this 21st day of January 1964.

(SEAL)
Attest:

ERNEST W. SWIDER                                   EDWIN L. REYNOLDS

Attesting Officer                                    Acting Commissioner of Patents